(12) United States Patent
Nevrkla

(10) Patent No.: US 7,393,408 B2
(45) Date of Patent: Jul. 1, 2008

(54) MODIFIED POWDERED MASS FOR TREATMENT OF SOILS AND LOOSE BUILDING MATERIALS

(76) Inventor: Vlastimil Nevrkla, Čimelická 957, 142 00 Praha 4 (CZ)

( * ) Notice: Subject to any disclaimer, the term of this patent is extended or adjusted under 35 U.S.C. 154(b) by 682 days.

(21) Appl. No.: 10/490,091

(22) PCT Filed: Sep. 20, 2002

(86) PCT No.: PCT/CZ02/00052

§ 371 (c)(1),
(2), (4) Date: Aug. 17, 2004

(87) PCT Pub. No.: WO03/025091

PCT Pub. Date: Mar. 27, 2003

(65) Prior Publication Data

US 2004/0258477 A1  Dec. 23, 2004

(30) Foreign Application Priority Data

Sep. 21, 2001  (CZ) .................................. 2001-3395

(51) Int. Cl.
*C04B 2/02*  (2006.01)

(52) U.S. Cl. .................... 106/900; 106/724; 106/792; 106/795

(58) Field of Classification Search ................. 106/900, 106/724, 792, 795
See application file for complete search history.

(56) References Cited

U.S. PATENT DOCUMENTS 4,303,450 A * 12/1981 Hacker
6,406,538 B1 * 6/2002 Laudet et al. ............... 106/792
6,699,322 B2 * 3/2004 Laudet et al. ............... 106/900

OTHER PUBLICATIONS

Answer 13 of 26 of Chem Abstract on STN☐☐☐☐WO 9823705, Laudet et al. (Jun. 4, 1998) Abstract Only.*
Answer 17 of 26 of Chem Abstract on STN☐☐☐☐DD 247236 (Jul. 1, 1987) Dembinski et al., abstract only.*

* cited by examiner

*Primary Examiner*—Paul Marcantoni
(74) *Attorney, Agent, or Firm*—Notaro & Michalos P.C.

(57) ABSTRACT

Modified Powdered Mass for treatment of soils and loose building materials containing caustic lime and/or calcareous hydraulic binders and a modification component, where the modification component consists of linear olefins containing 10 to 24 carbon atoms, alone or in their mutual combination, or in mixture with their isomers.

6 Claims, No Drawings

MODIFIED POWDERED MASS FOR TREATMENT OF SOILS AND LOOSE BUILDING MATERIALS

TECHNICAL FIELD

The invention concerns Modified Powdered Mass for treatment of soils and loose building materials containing caustic lime and/or calcareous hydraulic binders, and a modification component that is not toxic and is environmentally friendly.

BACKGROUND ART

Powdered caustic lime has been still used for treatment and stabilization of soils in different branches of the building industry. The application of caustic lime itself produces high level of dustiness, which adversely influences agricultural crops, soils, as well as the environment on site and in its surroundings. The mentioned disadvantages have been partially removed by he use of modified lime pursuant to PCT WO98/23705 which contains, besides caustic lime, also a liquid additive (modification component) consisting of polyolefins, alkanes and cycloalkanes. Modified lime is prepared by adding the above-mentioned liquid additives to caustic lime, or to the hydraulic binder, or even during grinding caustic lime or the hydraulic binder. The technology of application of modified lime is utilized especially in construction of road and highways, railways and railway corridors, in construction of airport aprons, parking lots, embankments and tunnels. PCT WO98/23705 mentions the use of white mineral oil, which is the mixture of alkanes and cycloalkanes in the volume of 68% and 32%, respectively, its average molecular weight is 340 to 360 and its kinematic viscosity at 40° C. is 15 cP. The use of polyolefins, especially poly-$\alpha$-olefins and poly-intra-olefins is further stated here. The disadvantage of these additives, that are known up to now, is especially their low biological degradability and slightly worse ability of dust particles dispersion.

DISCLOSURE OF INVENTION

The mentioned disadvantages are removed by the Modified Powdered Mass for treatment of soils and loose building materials containing caustic lime and/or calcareous hydraulic binders and a modification component, in which, according to the invention, the modification component consists of linear olefins containing 10 to 24 carbon atoms, alone or in their mutual combination, or in mixture with their isomers. For the purposes of this invention, linear olefins are unbranched hydrocarbons with straight chain having at least one carbon-carbon double bound present in the chain. Linear olefins contain from 12 to 24 carbon atoms, more advantageously from 14 to 18 carbon atoms. Industrially available linear olefins with 14 to 18 carbon atoms, or with a higher number of carbon atoms, have the required properties of synthetic hydrocarbons suitable as a modification component. Such properties are, among others, kinematic viscosity, inflammation point, solidification point, reactivity and minimum toxicity. It has been found that mixtures of linear olefins can, as an advantage, contain mixtures consisting of $C_{14}$, $C_{16}$ or $C_{18}$, normal, $\alpha$- and linear internal olefins or their combination, while the invention is not limited only to these synthetic hydrocarbons.

Linear olefins used according to this invention can be produced by different ways that are well-known to any professional in the branch. Such ways include cracking of linear aliphatic hydrocarbons, metathesis or disproportionation of olefins, especially $\alpha$-olefins, ethylene oligomerization, dehydrogenation of lineral aliphatic hydrocarbons, and isomerization of the double bond of normal $\alpha$-olefins etc.

Mixtures consisting mainly of $C_{14}$ normal $\alpha$-olefins are very favorable. Especially favorable are the mixtures consisting of 67-74% of volume of $C_{14}$ and 26-33% of volume of $C_{18}$ linear $\alpha$-olefin. In some cases, $C_{14}$ normal $\alpha$-olefins can be mixed with isomerized $C_{16}$ to $C_{24}$ products to produce mixtures with suitable properties for preparation of Modified Powdered Mass.

Kinematic viscosity of the modification component is an important parameter. The values of kinematic viscosity for the modification component consisting of $C_{14}$ to $C_{18}$ linear olefins alone or in their combination range from 3.1 to 3.9 cP, which enables a better dispersion of the smallest particles in the caustic lime and hydraulic binders. The result is considerable reduction of dust emissions without any unfavorable impact on the fluidity of the product and its reactivity.

Another requirement for the modification component is that it should have a relatively high inflammation point for reasons of safety. It would be an advantage if the temperature is above 90° C., especially advantageous is the inflammation point above 110° C.

The modification component according to this invention considerably reduced dustiness of Modified Powdered Mass. The reactivity of $t_{60° C.}$ approached the reactivity of powdered caustic lime.

The modification component, with regard to its physico-chemical properties, enables very good homogenization in treating Modified Powdered Mass and its subsequent application.

The modification component, according to the invention, has high biological degradability ranging from 97 to 99% in 21 days (determined according to the test CEC-L-33-T-82).

Modified Powdered Mass is not toxic, is environmentally compatible, it improves mechanical properties of soil and loose building materials, e.g. of power plant air dust, blast-furnace cinder etc., and it can be used immediately.

The invention will be explained in more details using examples of factual execution.

EXAMPLES

Example 1

0.6% of volume of 1-decene was added to 100 g of caustic lime, and the mixture was intensively mixed at the temperature of 20° C. during the period of 5 minutes. The same was done with samples of 0.8 and 1.0% of volume of the modification component. Dustiness (%) and reactivity $t_{60° C.}$ (min) of the individual samples of Modified Powdered Mass are stated in the following table:

| Concentration (% of volume) of the modification component | Dustiness (%) | Reactivity $t_{60° C.}$ (min) |
|---|---|---|
| unmodified lime | 59.0-61.0 | 3.0-3.2 |
| 0.6 | 46.7 | 3.1 |
| 0.8 | 44.9 | 3.3 |
| 1.0 | 42.0 | 3.4 |

Example 2

0.6% of volume of 1-tetradecene was added to 100 g of caustic lime, and the mixture was intensively mixed at the temperature of 20° C. during the period of 5 minutes. The same was done with samples of 0.8 and 1.0% of volume of the modification component. Dustiness (%) and reactivity $t_{60°\,C.}$ (min) of the individual samples of Modified Powdered Mass are stated in the following table:

| Concentration (% of volume) of the modification component | Dustiness (%) | Reactivity $t_{60°\,C.}$ (min) |
|---|---|---|
| unmodified lime | 59.0-61.0 | 3.0-3.2 |
| 0.6 | 56.8 | 3.2 |
| 0.8 | 52.4 | 3.3 |
| 1.0 | 50.8 | 3.4 |

Example 3

0.6% of volume of mixture consisting of 74% of 1-tetradecene and 26% of 1-octadecene was added to 100 g of caustic lime, and the mixture was intensively mixed at the temperature of 20° C. during the period of 5 minutes. The same was done with samples of 0.8 and 1.0% of volume of the modification component. Dustiness (%) and reactivity $t_{60°\,C.}$ (min) of the individual samples of Modified Powdered Mass are stated in the following table:

| Concentration (% of volume) of the modification component | Dustiness (%) | Reactivity $t_{60°\,C.}$ (min) |
|---|---|---|
| unmodified lime | 59.0-61.0 | 3.0-3.2 |
| 0.6 | 51.3 | 3.2 |
| 0.8 | 49.0 | 3.2 |
| 1.0 | 47.3 | 3.4 |

Example 4

0.6% of volume of 1-octadecene was added to 100 g of caustic lime, and the mixture was intensively mixed at the temperature of 20° C. during the period of 5 minutes. The same was done with samples of 0.8 and 1.0% of volume of the modification component. Dustiness (%) and reactivity $t_{60°\,C.}$ (min) of the individual samples of Modified Powdered Mmass are stated in the following table:

| Concentration (% of volume) of the modification component | Dustiness (%) | Reactivity $t_{60°\,C.}$ (min) |
|---|---|---|
| unmodified lime | 59.0-61.0 | 3.0-3.2 |
| 0.6 | 50.0 | 3.4 |
| 0.8 | 47.9 | 3.4 |
| 1.0 | 46.8 | 3.5 |

Example 5

0.6% of volume of mixture consisting of 50% of 1-decene and 50% of isomer of $C_{20}$-$C_{24}$ was added to 100 g of caustic lime, and the mixture was intensively mixed at the temperature of 20° C. during the period of 5 minutes. The same was done with samples of 0.8 and 1.0% of volume of the modification component. Dustiness (%) and reactivity $t_{60°\,C.}$ (min) of the individual samples of Modified Powdered Mass are stated in the following table:

| Concentration (% of volume) of the modification component | Dustiness (%) | Reactivity $t_{60°\,C.}$ (min) |
|---|---|---|
| unmodified lime | 59.0-61.0 | 3.0-3.2 |
| 0.6 | 51.0 | 3.6 |
| 0.8 | 49.0 | 3.6 |
| 1.0 | 47.2 | 3.5 |

The used values for concentrations of 0.6-1.0% of volume of the modification component are optimum. With higher concentration of the modification component, its effect is not so distinct and the possibility of problems in manipulation with Modified Powdered Mass raise.

The dustiness of Modified Powdered Mass has been determined by means of a comparative method based on determination of loss of the finest portion of lime during blowing-through with air. The results have been compared to the values of unmodified lime.

The determination of reactivity of unmodified lime and of Modified Powdered Mass is based on measurement of temperature that is released due to exothermic reaction with water, in dependence on reaction time. The above-mentioned measurements have been performed in harmony with the Standard CSN EN 459-2.

INDUSTRIAL APPLICABILITY

According to the invention, the Modified Powdered Mass can be taken advantage of in building industry, especially in construction of roads, highways, airport, parking lots, tunnels, in railway building and chemical industry.

The invention claimed is:

1. A modified powder mass for treatment of soils and loose building materials containing caustic lime and/or calcareous hydraulic binders and a modification component, comprising a modification component consists of non-toxic and biologically degradable linear olefins containing 10 to 24 carbon atoms, alone or in their mutual combination, or in mixture with their isomers.

2. The modified powdered mass pursuant to claim 1 distinguishing itself by the fact that the linear olefins are olefins containing 14 to 1 8 carbon atoms, alone or combined.

3. The modified powdered mass pursuant to claim 1 distinguishing itself by the fact that the modification components consists of $C_{14}$ linear α-olefin with isomerized olefins $C_{16}$ to $C_{24}$.

4. The modified powdered mass pursuant to claim 1 distinguishing itself by the fact that the modification components consists of 67-74% of volume of $C_{14}$ linear olefin and 26-33% of volume of $C_{18}$ linear olefin.

5. The modified powdered mass pursuant to claim 1 distinguishing itself by the fact that kinematic viscosity of linear olefins $C_{14}$ to $C_{18}$ and their mixtures is 3.1 to 3.49 cP, measured at the temperature of 20° C.

6. The modified powdered mass pursuant to claim 1 distinguishing itself by the fact that the biological degradability of the modification component in 21 days is 97-99%.

* * * * *